(12) United States Patent
Schult et al.

(10) Patent No.: US 9,302,636 B2
(45) Date of Patent: Apr. 5, 2016

(54) ELECTRICAL SYSTEM FOR AN AIRCRAFT

(71) Applicant: AIRBUS OPERATIONS GMBH, Hamburg (DE)

(72) Inventors: Jens Schult, Stelle (DE); Henning Everth, Hamburg (DE); Fabian Kraus, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 628 days.

(21) Appl. No.: 13/718,836

(22) Filed: Dec. 18, 2012

(65) Prior Publication Data

US 2013/0154357 A1 Jun. 20, 2013

Related U.S. Application Data

(60) Provisional application No. 61/577,986, filed on Dec. 20, 2011.

(30) Foreign Application Priority Data

Dec. 20, 2011 (DE) .......................... 10 2011 121 707

(51) Int. Cl.
 *B60R 16/03* (2006.01)
 *H02J 4/00* (2006.01)

(52) U.S. Cl.
 CPC . *B60R 16/03* (2013.01); *H02J 4/00* (2013.01); *B64D 2221/00* (2013.01)

(58) Field of Classification Search
 USPC .......................................................... 307/9.1
 See application file for complete search history.

(56) References Cited

U.S. PATENT DOCUMENTS

| | | | |
|---|---|---|---|
| 2,191,518 A * | 2/1940 | Clerc | ................. 62/165 |
| 3,764,872 A | 10/1973 | Boice | |
| 4,227,138 A | 10/1980 | Espelage et al. | |
| 5,309,081 A * | 5/1994 | Shah et al. | ....................... 322/10 |
| 5,412,557 A * | 5/1995 | Lauw | ................. 363/37 |
| 6,144,176 A | 11/2000 | Qunlan | |
| 6,693,809 B2 * | 2/2004 | Engler | .................. H02M 7/493 363/71 |
| 6,700,222 B2 * | 3/2004 | Turvey | ............................ 307/87 |
| 7,173,399 B2 | 2/2007 | Sihler et al. | |
| 7,468,561 B2 | 12/2008 | Kern et al. | |
| 7,565,903 B2 | 7/2009 | Sasaki et al. | |
| 7,768,220 B2 | 8/2010 | Schulz et al. | |
| 8,461,793 B2 | 6/2013 | Ohshima | |
| 2002/0074863 A1 * | 6/2002 | Turvey | ........................... 307/87 |
| 2006/0043922 A1 * | 3/2006 | Baker | .................. H02M 7/493 318/807 |
| 2008/0111421 A1 * | 5/2008 | Anghel et al. | ................... 307/23 |
| 2008/0238202 A1 * | 10/2008 | Kern et al. | ...................... 307/53 |
| 2010/0060000 A1 * | 3/2010 | Scholte-Wassink | ........... 290/44 |

(Continued)

OTHER PUBLICATIONS

USPTO, Response to Office Action for U.S. Appl. No. 13/685,992, mailed Nov. 20, 2014.

(Continued)

*Primary Examiner* — Ronald W Leja
(74) *Attorney, Agent, or Firm* — Ingrassia Fisher & Lorenz, P.C.

(57) ABSTRACT

An electrical system for an aircraft is provided. The system comprises an inverter for transforming a first alternating current from an on-board network having a variable frequency into a second alternating current, and at least a first electrical load and at least a second electrical load, which are configured to be operated simultaneously by the second alternating current.

18 Claims, 2 Drawing Sheets

(56) References Cited

U.S. PATENT DOCUMENTS

| | | |
|---|---|---|
| 2010/0231159 A1 | 9/2010 | Obi et al. |
| 2010/0276996 A1* | 11/2010 | Karipides ................. 307/22 |
| 2011/0111683 A1 | 5/2011 | Kelnhofer |
| 2012/0175955 A1* | 7/2012 | Carralero et al. ............. 307/38 |
| 2013/0134916 A1* | 5/2013 | Schult .................. H02P 23/04 318/400.23 |
| 2013/0154357 A1* | 6/2013 | Schult et al. .................. 307/9.1 |
| 2013/0154536 A1* | 6/2013 | Park ..................... H02M 7/797 318/503 |
| 2013/0241444 A1* | 9/2013 | Fotherby ................... H02P 5/74 318/51 |
| 2014/0132062 A1* | 5/2014 | Brombach et al. ............. 307/9.1 |
| 2014/0139016 A1* | 5/2014 | Lovercheck ............ B60L 1/003 307/9.1 |

OTHER PUBLICATIONS

USPTO, Supplemental Response to Office Action for U.S. Appl. No. 13/685,992, mailed Dec. 10, 2014.

USPTO, Final Office Action for U.S. Appl. No. 13/685,992, mailed Dec. 26, 2014.

German Patent Office, German Office Action dated Dec. 19, 2012 for German Patent Application No. 102011121707.3.

Mildice et al., "Variable-Speed Induction Motor Drives for Aircraft Environmental Control Compressors", NASA Technical Memorandum, 31st Intersociety Energy Conversion Engineering Conference, Aug. 11-16, 1996, Washington, D.C.

USPTO, Notice of Allowance for U.S. Appl. No. 13/685,992, mailed Mar. 6, 2015.

USPTO, Office Action for U.S. Appl. No. 13/685,992 mailed Aug. 20, 2014.

De Rosa, F., et al. "On the Interharmonic Components Generated by Adjustable Speed Drives," IEEE Transactions on Power Delivery, Oct. 2005, pp. 2535-2543, vol. 20, No. 4.

German Patent Office, German Office Action for Application No. 102011119644.0, dated Aug. 28, 2012.

U.S. Appl. No. 13/685,992, filed Nov. 22, 2012, entitled Controlling an Electrical Consumer of an Aircraft.

* cited by examiner

ELECTRICAL SYSTEM FOR AN AIRCRAFT

CROSS-REFERENCE TO RELATED APPLICATIONS

This application claims priority to German Patent Application No. 10 2011 121 707.3, filed Dec. 20, 2011 and to U.S. Provisional Patent Application No. 61/577,986, filed Dec. 20, 2011, which are each incorporated herein by reference in their entirety.

TECHNICAL FIELD

The technical field relates to an electrical system for an aircraft and a method, a computer program and a computer-readable medium for operating an electrical system of an aircraft.

BACKGROUND

Most aircraft comprise an electrical on-board network which is supplied with electrical energy by generators which are mechanically connected to engines of the aircraft. In order to save weight and to simplify the construction of an engine, for example a turbine, it is possible to dispense with a gear unit which has a transmission ratio and couples the generator with the engine and to directly connect the generator to the engine. This can lead to the on-board network frequency changing depending on the rotational speed of the engine. In this case, the on-board network of the aircraft is generally configured in such a way that it can be operated at a variable frequency. For example, a generator coupled directly with a turbine can produce a frequency of between 360 and 800 Hz, which is fed into the on-board network.

Many electrical loads in the aircraft, which for example include pumps or fans, are operated by electrical energy from the on-board network. Owing to the variable frequency, it may be necessary to decouple said loads by means of frequency converters.

In particular if motor-driven loads are to be operated at a desired rotational speed on an on-board network having a variable frequency, decoupling by means of direct current links and inverters may be necessary. This approach can, owing to the high network quality requirements, be very expensive and also relatively difficult, since complex filters and rectifier circuits (due to the high network quality requirements) may be used.

Examples of electrical loads of this type include fans for ventilation, as described in DE 10 2008 025 960 A1 and US 2011/0111683 A1. In addition, other objects, desirable features and characteristics will become apparent from the subsequent summary and detailed description, and the appended claims, taken in conjunction with the accompanying drawings and this background.

SUMMARY

Accordingly, it can be desirable to reduce the weight of an aircraft and to simplify the electrical system of an aircraft.

One of various aspects of the present disclosure relates to an electrical system for an aircraft. An electrical system may mean a plurality of electrical and electronic components of the aircraft which are interconnected via electrical lines. The electrical system may also comprise a control unit for these components.

According to an exemplary embodiment of the present disclosure, the system comprises an inverter for transforming a first alternating current from an on-board network having a variable first frequency into a second alternating current and at least a first electrical load and at least a second electrical load, which are configured to be operated simultaneously by the second alternating current.

At least two electrical loads may therefore be supplied with electrical energy by means of a single inverter. In this way, in the case of electrical loads which may be put into groups which achieve the same object, such as ventilators of an air-conditioning system, a large number of inverters may be dispensed with, and this may lead to a reduction in the weight of the aircraft.

The aircraft comprises an on-board network which is supplied by generators having a variable on-board network frequency. The alternating current having the variable on-board network frequency is converted by the converter into an alternating current which may be consumed by the electrical loads. For example, the electrical loads may comprise synchronous motors or asynchronous motors which are supplied with alternating current by the inverter simultaneously.

In general, an inverter comprises a rectifier for rectifying the first alternating current and a converter for producing the second alternating voltage from the direct current of the rectifier. In order, for example, to reduce the disturbances of the inverter to the on-board network, a 12-point rectifier may be used, which generally contains a transformer.

The electrical loads may each comprise an electric motor as a drive for a conveying device, by means of which a fluid, such as cabin air, may be conveyed together with the group of electrical loads. In general, it is possible in this way to use conventional, cheap and robust drive technology, in one example, where drives are in groups and only a single rotational speed or a rotational speed which may be commonly changed is required. Each plurality of motors of a group may be operated by just one inverter. The commonly used frequency may thus be considerably higher than the network frequency of the on-board network, and this may lead to saving on weight with the motors used.

Potential back reactions on the on-board network may only occur by means of the common inverter, which may reduce the overall complexity of the filter technology and monitoring measures to one place. This may lead to a lower total weight and lower costs on a system level.

According to an exemplary embodiment of the present disclosure, the electrical system further comprises a first load switch for disconnecting the first electrical load from the inverter and a second load switch for disconnecting the second electrical load from the inverter. Each of the electrical loads may be separately disconnected from the inverter via a load switch which is associated with the electrical load.

If an electrical load in a group fails, then the remaining electrical loads in the group may be operated at a somewhat higher frequency and the total capacity of the ventilation system is thus kept constant.

Asynchronous motors may also be directly connected to the inverter by switching elements or load switches.

This is also possible for synchronous motors, since it is possible via the control to restart after each configuration. If the rotational speed of all the motors connected to an inverter is monitored, a complete start-up may be dispensed with when using synchronous motors by the output frequency of the inverter being reduced until all the motors run synchronously again. This is possible since, for example in the case of fans, the load moment at low rotational speeds is very low.

According to an exemplary embodiment of the present disclosure, the inverter is a first inverter and the electrical system further comprises a second inverter and a collector line. It is further conceivable to have a redundancy of the inverter available, in order to be able to continue operating the individual electrical loads if the inverter or the supplying bar fails.

According to an exemplary embodiment of the present disclosure, the collector line connects the first inverter to the second inverter. In this way, all the electrical loads which are each connected to one inverter may also be supplied with current by the other inverter.

According to an exemplary embodiment of the present disclosure, the first electrical load and the second electrical load may be connected to the first inverter and the second inverter via the collector line. In one example, the individual loads may be disconnected from the collector line (for example an inverter bar) by a power circuit breaker (i.e. by a load switch), in order not to influence the availability of the remaining electrical loads if one electrical load fails.

According to another exemplary embodiment of the present disclosure, the electrical system further comprises a first collector line switch for disconnecting the first inverter from the collector line and/or a second collector line switch for disconnecting the second inverter from the collector line. If an inverter fails or experiences a disturbance, it may be disconnected from the collector line.

According to an exemplary embodiment of the present disclosure, the electrical system further comprises a third collector line switch for disconnecting a first part of the collector line, which is connected to the first inverter, from a second part of the collector line, which is connected to the second inverter. A first group of electrical loads may be connected to the first part of the collector line, and a second group of electrical loads may be connected to the second part of the collector line. These two groups may be disconnected from one another and also interconnected by means of the third collector line switch. In this way, the first group and the second group may each be disconnected from one another by the first inverter and may be supplied with current by the second inverter. It is, however, possible for two groups to be commonly supplied with current by just one inverter respectively or for two groups to be commonly supplied with current by two inverters.

According to an exemplary embodiment of the present disclosure, at least the first electrical load may be connected to the first part of the collector line and/or at least the second electrical load may be connected to the second part of the collector line. This may, for example, take place via a load switch.

According to an exemplary embodiment of the present disclosure, the electrical system further comprises a control unit which is configured to control the (first and second) inverter(s) in such a way that an adjustable output frequency is produced for the second alternating current and/or said control unit is configured to control switches of the system and to open and/or close said switches. Opening and closing the switches and adjusting the frequency of the second alternating current in the collector line may take place completely automatically by means of the control unit.

It is, however, possible for the switches, for example the collector line switches and/or the load switches, to be controlled manually and to be, for example, purely mechanical switches. These could be used during maintenance or for maintaining airworthiness after failure of a system part.

According to an exemplary embodiment of the present disclosure, the first electrical load comprises a first motor and the second electrical load comprises a second motor. In one example, in a group of motors, a common rotational speed may be set for the motors having the frequency of the second alternating voltage.

Both asynchronous motors of a conventional construction and synchronous motors, which are used for example in inverter drives due to the greater efficiency thereof, are used as the motors. This is possible since all the motors in a group may be started up together from the idle state. Potential differences in rotational speed within the group may also be taken into account by a suitable selection of the number of pairs of poles in a motor.

According to another exemplary embodiment of the present disclosure, the first electrical load comprises a first conveying device and the second electrical load comprises a second conveying device. As already mentioned, the electrical loads may be put into groups which achieve the same object at the same time, such as conveying a fluid. The conveying devices may be, for example, fans or ventilators connected in parallel or pumps connected in parallel.

For example, in the case of a ventilation system of an aircraft, a plurality of fans are respectively interconnected in groups which are logical in terms of ventilation.

Another exemplary aspect of the present disclosure relates to an aircraft, for example an airplane, and in one example, a passenger airplane, the cabin of which may be supplied with air for example by an air-conditioning system which comprises a large number of fans.

According to an exemplary embodiment of the present disclosure, the aircraft comprises a generator, which is mechanically coupled with a drive of the aircraft, for supplying an on-board network of the aircraft with electrical energy and comprises an electrical system as described above and below. The electrical system is generally only coupled with the on-board network via at least one inverter.

Another exemplary aspect of the present disclosure relates to a method for operating an electrical system of an aircraft which may be carried out by a control unit with the electrical system.

According to an exemplary embodiment of the present disclosure, the method comprises transforming an alternating current from an on-board network having a variable first frequency into a second alternating current having a second frequency and operating at least one first electrical load and at least one second electrical load with the second alternating current. As already mentioned, a plurality of electrical loads may be supplied with an alternating voltage by a single electrical inverter.

According to an exemplary embodiment of the present disclosure, the method further comprises determining a common conveying capacity of a first and a second conveying device and operating the electrical loads in such a way that the first and second conveying devices provide the common conveying capacity. For example, a group of motors having the same rotational speed may be operated.

According to an exemplary embodiment of the present disclosure, the method further comprises changing the second frequency of the second alternating current depending on the common conveying capacity. The rotational speed of the motors may be set by the second frequency.

According to an exemplary embodiment of the present disclosure, the method further comprises switching on the first and the second motor depending on the common conveying capacity. It is also possible for the motors always to be operated at the same rotational speed, the number of motors which are running being determined depending on the output.

It is also possible for the rotational speed of the motors and the number of running motors to be set at the same time.

According to an exemplary embodiment of the present disclosure, the method further comprises transforming the alternating current from the on-board network by means of a first inverter, disconnecting the first inverter from the first and the second electrical load, connecting a second inverter to the first and the second electrical load and transforming the alternating current from the on-board network by means of the second inverter.

If the first inverter or a generator coupled with the first inverter fails or malfunctions, the second inverter may take over the role of the first inverter. For example, the first inverter may be disconnected from the collector line or bus bar by means of the first collector line switch and the second inverter may be connected to the collector line by the second collector line switch. A first group of electrical loads, which were initially connected to the first inverter via a first part of the collector line, may be connected to the second inverter by closing the third collector line switch, which second inverter may then operate the first group of electrical loads.

Further exemplary aspects of the present disclosure relate to a computer program which, when executed on a processor, instructs the processor to carry out the method as described above and below, and to a computer-readable medium on which a computer program of this type is stored. A computer-readable medium may comprise, for example, a RAM, a ROM, an EPROM, a FLASH memory, a floppy disk, a CD, a DVD or a hard drive.

Another exemplary aspect of the present disclosure relates to a control unit or a control system for the electrical system, which is configured to carry out the method as described above and below. Said control unit may for example comprise a processor which is configured to execute the above-mentioned computer program, and a non-volatile memory as a computer-readable medium on which said program is stored.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
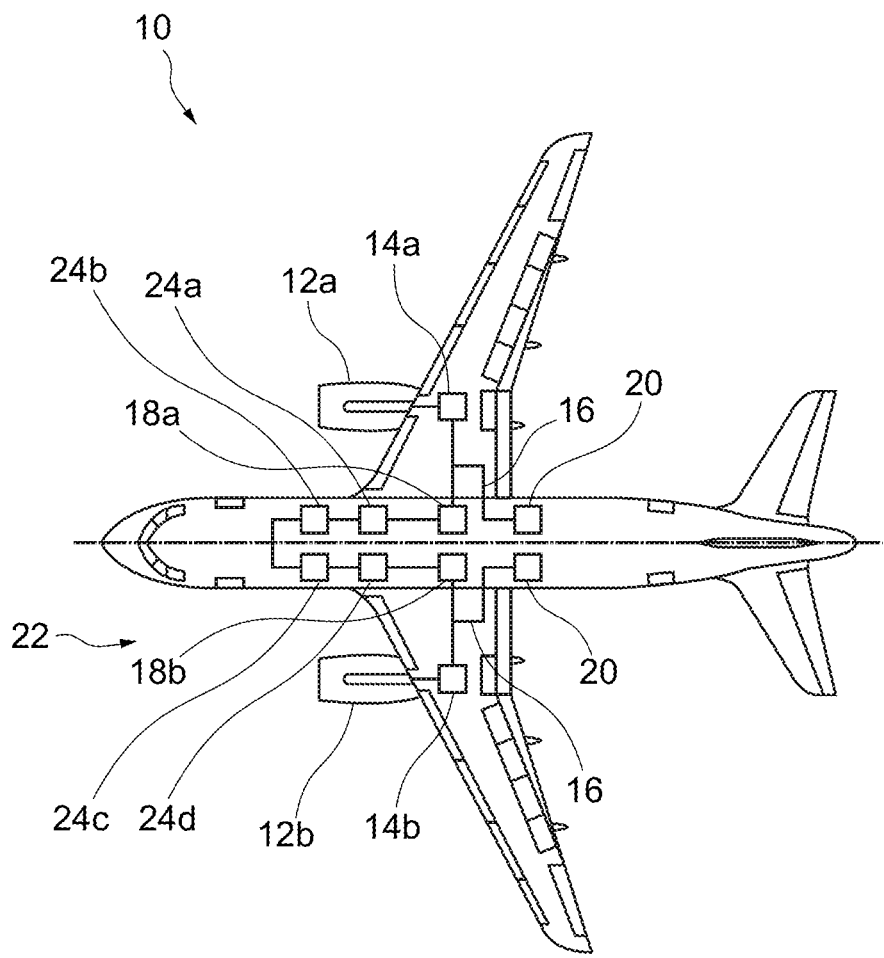
FIG. 1 schematically shows an aircraft according to an exemplary embodiment of the present disclosure.

FIG. 1 shows an aircraft 10 in the form of a passenger aircraft 10 which comprises two turbines 12a, 12b as drives. Generators 14a, 14b are mechanically coupled with the turbines 12a, 12b and feed electric current into an on-board network 16 of the aircraft 10 during operation of the turbines 12a, 12b. Depending on the operational state of the turbines, the generators 14a, 14b may produce a variable network frequency of between about 360 and about 800 Hz in the on-board network 16.

A plurality of electrical loads 20 is connected to the on-board network 16. An electrical system 22, which comprises an inverter 18a, 18b which is coupled with the on-board network 16 and a plurality of electrical loads 24a, 24b, 24c, 24d, which are supplied by the inverter 18a, 18b, is also connected to the on-board network 16.

As shown in FIG. 1, the two inverters 18a, 18b may be located at different points in the aircraft 10 for safety reasons, for example on the left-hand and the right-hand side thereof.

Figure 2:
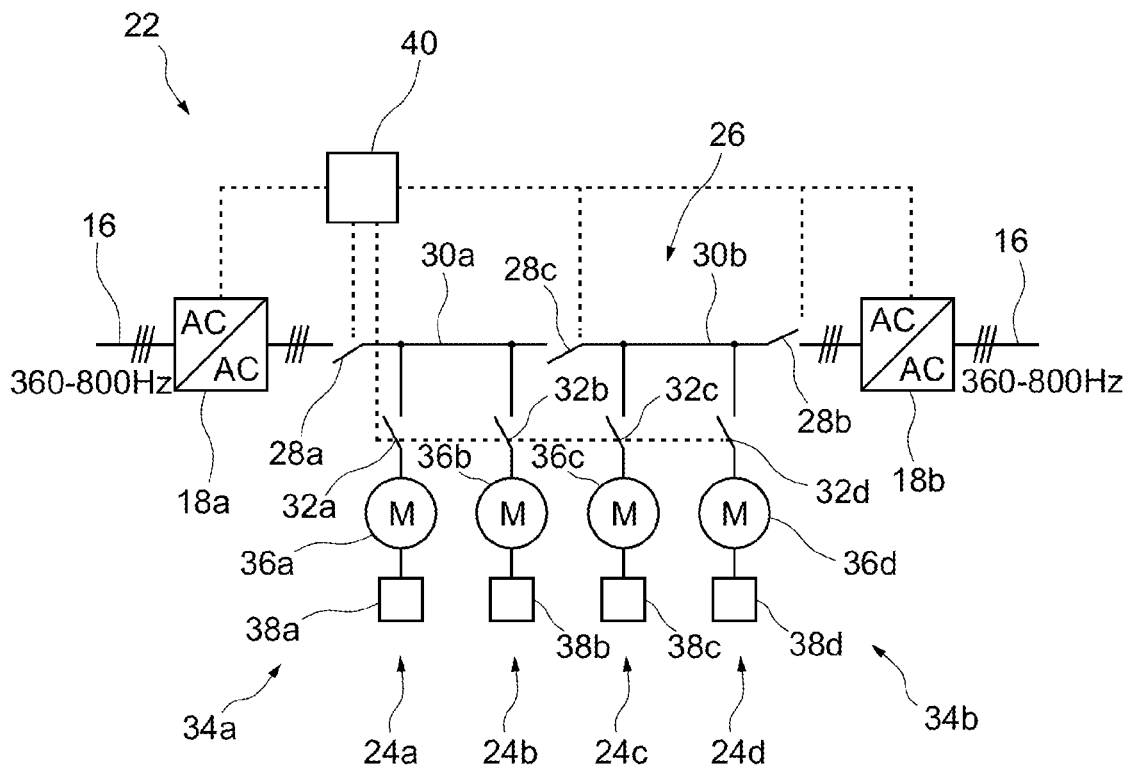
FIG. 2 schematically shows an electrical system according to an exemplary embodiment of the present disclosure.

FIG. 2 shows the electrical system 22 in greater detail. A first inverter 18a is connected to a first generator 12a via the on-board network 16. The first inverter 18a is configured to convert the first variable frequency of for example about 360 to about 800 Hz into a second frequency, by means of which the electrical loads 24a, 24b, 24c, 24d may be operated.

An additional, second inverter 18b is connected to a second generator 12b via the on-board network 16. In the same way as the first inverter 18a, the second inverter 18b is configured to convert the first variable frequency of for example about 360 to about 800 Hz into a second frequency, by means of which the electrical loads 24a, 24b, 24c, 24d may be operated.

The two inverters 18a, 18b may each comprise a rectifier for rectifying the first frequency, a direct current link and a converter, which may convert the direct current from the direct current link into the second frequency. In one example, a rectifier which is configured to only produce low disturbances in the on-board network 16, such as a 12-point rectifier, is generally very heavy, since it comprises a separate transformer. Owing to the fact that the electrical system 22 only comprises one inverter, or for reasons of redundancy only two inverters 18a, 18b, the electrical system 22 may be configured to be significantly lighter than an electrical system in which each of the electrical loads 24a, 24b, 24c, 24d would have a separate inverter.

The two converters 18a, 18b may be interconnected via a collector line 26. The collector line may be a bus line or a bus bar, in which the electrical loads may be connected to the two inverters 18a, 18b via a single line.

A first collector line switch 28a is arranged in the collector line 26 and may disconnect the first inverter 18a from the collector line 26. A second collector line switch 28b is also arranged in the collector line 26 and may disconnect the second inverter 18b from the collector line 26. A third collector line switch 28c is arranged in the collector line 26 in such a way that a first part 30a of the collector line 26 may be disconnected from a second part 30b of the collector line 26.

The electrical loads 24a, 24b, 24c, 24d are each connected to the collector line 26 and may thus be connected to the two inverters 18a, 18b. In order for it to be possible to disconnect the electrical loads 24a, 24b, 24c, 24d individually from the inverters 18a, 18b and/or from the collector line 26, each of the electrical loads 24a, 24b, 24c, 24d is associated with a load switch 32a, 32b, 32c, 32d.

The on-board network 16 and the collector line 26 may comprise three phases. The current in the on-board network 16 and in the collector line 26 may be three-phase current.

A first group 34a of electrical loads 24a, 24b may be connected in this case to the first part 30a of the collector line 26. A second group 34b of electrical loads 24c, 24d may be connected to the second part 30b of the collector line 26.

For example, the electrical loads 24a, 24b, 24c, 24d may each comprise an electric motor 36a, 36b, 36c, 36d and a conveying device 38a, 38b, 38c, 38d which may be operated by means of the electric motor 36a, 36b, 36c, 36d. The conveying devices 38a, 38b, 38c, 38d may be conveying devices for air or liquids which comprise fans or pumps, for example. In one example, a ventilation system or an air-conditioning system of the aircraft 10 may comprise a plurality of ventilation apparatuses 24a, 24b, 24c, 24d which serve to convey air from the surroundings into the inside of the aircraft 10, to convey air between interior spaces of the aircraft 10 and/or to circulate air.

The aircraft 10 and in one example, the electrical system 22 may comprise a control unit 40, for example a control for an air-conditioning system which may control the individual components 18a, 18b, 28a, 28b, 28c, 32a, 32b, 32c, 32d of the electrical system via control lines 22.

In one example, the control unit 40 may control the inverters 18a, 18b and for example, the converters thereof in such a way (for example by means of pulse-width modulation) that the inverters 18a, 18b produce a predetermined second frequency.

It is further possible for the control unit 40 to be able to open and close the load switches 32a, 32b, 32c, 32d selectively, i.e. separately, in order to disconnect the electrical loads 24a, 24b, 24c, 24d from the collector line 26 or the current supply thereof, or to connect said loads thereto. The load switches 32a, 32b, 32c, 32d (and the other switches 28a, 28b, 28c) may for example be electrical relays.

It is also possible for the control unit 40 to open and close the collector line switches 28a, 28b, in order to disconnect the inverters 18a, 18b from the collector line 26 or to connect them thereto. The same applies to the collector line switch 28c, in order to disconnect from one another or to interconnect the two parts 30a, 30b of the collector line 26.

Figure 3:
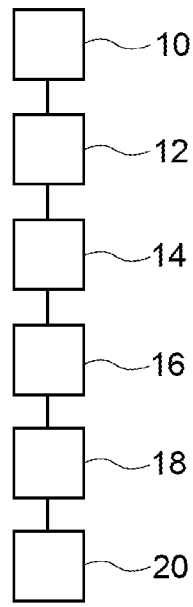
FIG. 3 shows a flow diagram for a method for controlling an electrical load according to an exemplary embodiment of the present disclosure.

FIG. 3 shows a flow diagram for a method for operating the electrical system by means of the control unit 40. Normally, the two collector line switches 28a, 28b are closed and the collector line switch 28c is open.

In block 10, the control unit 40 determines a common conveying capacity for the conveying devices 38a, 38b of the first group 34a of electrical loads 24a, 24b. For example, the conveying devices 38a, 38b are fans which blow air into the passenger cabin of the aircraft 10.

In block 12, the control unit 40 determines how the first group 34a of electrical loads 24a, 24b may be operated, in order to reach the previously determined conveying capacity. For this purpose, the control unit 40 may accordingly set the alternating current, which is produced by the inverter 18a, with which the motors 38a, 38b from the first group 34a are operated, and/or may determine the number of motors 36a, 36b which are to be operated with the alternating current in order to reach the desired conveying capacity.

In block 14, the control unit 40 then opens and/or closes the load switches 32a, 32b and operates the inverter 18a accordingly, in such a way that said inverter for example produces the second alternating current by means of pulse-width modulation and transforms the variable alternating current from the on-board network 16 having a variable first frequency into a second alternating current.

Blocks 10 to 14 may be accordingly carried out for the second group 34b of electrical loads 24c, 24d and the inverter 18b.

If one of the inverters 18a, 18b malfunctions or fails, or for example one of the generators 14a, 14b does not provide sufficient electrical energy, one of the inverters 18a, 18b may take over the function of the other.

For example, in the following the inverter 18a has failed. When this is determined by the control unit 40, the control unit 40 disconnects the inverter 18a from the collector line 26 in block 16 by opening the switch 28a. The first group 34a of electrical loads is therefore disconnected from the inverter 18a.

In block 18, the control unit 40 closes the switch 28a and thereby connects the first group 34a of electrical loads to the second inverter 18b.

In block 20, the control unit 40 now operates the inverter 18b in such a way that two groups 34a, 34b of electrical loads are operated by the inverter 18b. For example, the inverter 18b is configured to be redundant, in such a way that it may provide sufficient power for all the electrical loads. It is, however, also possible for the electrical loads to be operated at a reduced conveying capacity if an inverter 18b is to supply both groups 34a, 34b with electrical energy.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An electrical system for an aircraft, the electrical system being configured to drive a group of electric motors which drive a fluid conveying device, the electrical system comprising:
   an inverter for transforming a first alternating current from an on-board network having a variable frequency into a second alternating current;
   at least a first electrical load and at least a second electrical load, which are operated simultaneously by the second alternating current;
   wherein the first electrical load comprises the group of electric motors;
   wherein the electrical system is configured to, if an electric motor of the group of electric motors is out of operation, increase the frequency of the second alternating current and operate the remaining electric motors at a higher frequency.

2. The electrical system according to claim 1, further comprising:
   a first load switch for disconnecting the first electrical load from the inverter; and
   a second load switch for disconnecting the second electrical load from the inverter.

3. The electrical system according to claim 1, wherein the inverter is a first inverter and the electrical system further comprises:
   a second inverter; and
   a collector line that connects the first inverter to the second inverter,
   wherein the first electrical load and the second electrical load are connectable to the first inverter and the second inverter via the collector line.

4. The electrical system according to claim 3, further comprising:
   a first collector line switch for disconnecting the first inverter from the collector line; and
   a second collector line switch for disconnecting the second inverter from the collector line.

5. The electrical system according to claim 3, further comprising:
a third collector line switch for disconnecting a first part of the collector line, which is connected to the first inverter, from a second part of the collector line, which is connected to the second inverter,
wherein at least the first electrical load is connectable to the first part of the collector line.

6. The electrical system according to claim 5, wherein at least the second electrical load is connectable to the second part of the collector line.

7. The electrical system according to claim 1, further comprising:
a control unit that controls the inverter in such a way that an adjustable output frequency is produced for the second alternating current.

8. The electrical system according to claim 7, wherein the control unit controls switches of the electrical system to at least one of open and close the switches.

9. The electrical system according claim 1, wherein the second electrical load comprises a second motor.

10. The electrical system according to claim 1, wherein the first electrical load comprises a first conveying device and the second electrical load comprises a second conveying device.

11. An aircraft, comprising:
a generator that is mechanically coupled with a drive of the aircraft to supply an on-board network of the aircraft with electrical energy; and
an electrical system that includes an inverter that transforms a first alternating current from an on-board network having a variable frequency into a second alternating current, and at least a first electrical load and at least a second electrical load that are operable simultaneously by the second alternating current,
wherein the electrical system is coupled with the on-board network via the inverter,
wherein the electrical system is configured to drive a group of electric motors which drive a fluid conveying device,
wherein the first electrical load comprises the group of electric motors;
wherein the electrical system is configured to, if an electric motor of the group of electric motors is out of operation, increase the frequency of the second alternating current and operate the remaining electric motors at a higher frequency.

12. A method for operating an electrical system of an aircraft, comprising:
transforming an alternating current from an on-board network having a variable first frequency into a second alternating current having a second frequency; and
operating at least one first electrical load and at least one second electrical load with the second alternating current;
driving a group of electric motors with the second alternating current, wherein the group of electric motors drive a fluid conveying device,
if an electric motor of the group of electric motors is out of operation, increasing the frequency of the second alternating current and operating the remaining electric motors at a higher frequency.

13. The method according to claim 12, wherein the at least one first electrical load further comprises a first conveying device and the at least one second electrical load further comprises a second conveying device, and the method further comprises:
determining a common conveying capacity of the first conveying device and the second conveying device; and
operating the at least one first electrical load and the at least one second electrical load in such a way that the common conveying capacity is provided.

14. The method according to claim 13, wherein the at least one first electrical load further comprises a first motor for driving the first conveying device and the at least one second electrical load further comprises a second motor for driving the second conveying device, and the method further comprises:
changing a frequency of the second alternating current depending on the common conveying capacity; and
switching on the first motor and the second motor depending on the common conveying capacity.

15. The method according to claim 12, the method further comprising:
transforming the first alternating current from the on-board network by means of a first inverter;
disconnecting the first inverter from the at least one first electrical load and the at least one second electrical load;
connecting a second inverter to the at least one first electrical load and the at least one second electrical load; and
transforming the first alternating current from the on-board network by means of the second inverter.

16. A computer program product, comprising:
a non-volatile storage medium readable by a processor and storing instructions for execution by the processor for performing a method comprising:
transforming an alternating current from an on-board network having a variable first frequency into a second alternating current having a second frequency;
operating at least one first electrical load and at least one second electrical load with the second alternating current;
driving a group of electric motors with the second alternating current, wherein the group of electric motors drive a fluid conveying device,
if an electric motor of the group of electric motors is out of operation, increasing the frequency of the second alternating current and operating the remaining electric motors at a higher frequency.

17. A control unit for an electrical system of an aircraft, which is configured to carry out a method comprising:
transforming an alternating current from an on-board network having a variable first frequency into a second alternating current having a second frequency; and
operating at least one first electrical load and at least one second electrical load with the second alternating current;
driving a group of electric motors with the second alternating current, wherein the group of electric motors drive a fluid conveying device,
if an electric motor of the group of electric motors is out of operation, increasing the frequency of the second alternating current and operating the remaining electric motors at a higher frequency.

18. The control unit according to claim 17, wherein the at least one first electrical load further comprises a first conveying device and the at least one second electrical load further comprises a second conveying device, and the method further comprises:
determining a common conveying capacity of the first conveying device and the second conveying device; and
operating the at least one first electrical load and the at least one second electrical load in such a way that the common conveying capacity is provided;

driving a second group of electric motors with the second alternating current, wherein the group of electric motors drive a fluid conveying device,
if an electric motor of the second group of electric motors is out of operation, increasing the frequency of the second alternating current and operating the remaining electric motors at a higher frequency.

\* \* \* \* \*